United States Patent [19]
Meyrueix

[11] Patent Number: 5,793,782
[45] Date of Patent: Aug. 11, 1998

[54] LINEARIZED EXTERNAL MODULATOR TRANSMITTER WITH IMPROVED DYNAMIC RANGE

[75] Inventor: Paul Meyrueix, Santa Clara, Calif.

[73] Assignee: Ericsson, Inc., Menlo Park, Calif.

[21] Appl. No.: 749,811

[22] Filed: Nov. 15, 1996

[51] Int. Cl.$^6$ ........................................... H01S 3/10
[52] U.S. Cl. .................. 372/26; 372/38; 359/276
[58] Field of Search .................. 372/26, 38; 359/276

[56] References Cited

U.S. PATENT DOCUMENTS 5,347,529  9/1994  Hoe ............................................ 372/38

*Primary Examiner*—Rodney B. Bovernick
*Assistant Examiner*—Robert E. Wise
*Attorney, Agent, or Firm*—Lyon & Lyon LLP

[57] ABSTRACT

A linearized external modulator transmitter with improved dynamic range includes a limiter and a subtractor, which each receive one or more time-varying input signals. The limiter generates a first signal with an amplitude that is confined to a range bounded by preset positive and negative levels, wherein, between the preset levels, the transmitter has an optical power output that is linearly related to the input signal. The first signal is passed through a predistortion circuit connected to an external modulator as well as into the subtractor, which generates a signal equal to the amount by which the input signal exceeds, either positively or negatively, the limited first signal. The subtractor sends the excess signal to a tunable gain circuit connected to a laser. The laser is connected to the external modulator, which generates the optical power output of the transmitter. The transmitter can be adapted to include dual sets of inputs— e.g., for digital and analog channels—and the preset negative limit can be eliminated for improved analog distortion performance at low power output levels.

21 Claims, 2 Drawing Sheets

LINEARIZED EXTERNAL MODULATOR TRANSMITTER WITH IMPROVED DYNAMIC RANGE

FIELD OF THE INVENTION

The present invention pertains to the field of lightwave transmission systems, and more particularly to a method of externally modulating a transmitter in an analog lightwave video transmission system.

BACKGROUND

Transmission of analog and, in particular, video information is increasingly being implemented with lightwave technology. In lightwave transmission systems, analog information is transmitted by modulating the optical intensity output from a laser, which converts radio-frequency (RF) light waves into intensity-modulated light for transmission on optical fiber cables. Many video channels can be combined electronically and added directly as an RF signal injected into the laser transmitter.

In one class of laser transmitters, generally referred as externally modulated transmitters, the transmitter is composed of a laser and an intensity modulator, usually a Linb03 Mach-Zender electro-optic modulator. The RF signal is injected into the modulator, while the laser at the input of the modulator is kept unmodulated. In a second class of laser transmitters, generally referred to as directly modulated transmitters, the transmitter is composed of the laser alone. The RF signal is added to the CW laser bias current to direct modulate the optical output of this laser.

It is critical that distortion be minimized in analog lightwave video transmission systems. Higher order distortion, such as third-order, (composite triple bit02 ("CTB)") distortion, or fifth-order distortion, is particularly undesirable. Another problem is clipping, which occurs at a modulation of greater than 100%, since the minimum power output of the modulator is zero.

Direct modulation of a signal can cause fiber-induced distortion, particularly in non-dispersion-shifted optical fibers, when a transmission wavelength of 1550 nanometers (nm) is employed. However, 1550 nm is a desirable wavelength for using in downstream video-broadcasting and near-video-on-demand systems. In particular, at a wavelength of 1550 nm, the transmitter can take optimal advantage of known optical amplification systems. For example, gains of up to thirty decibels (dB) are attainable at 1550 nm using an erbium-doped fiber amplifier (EDFA). Thus, external modulation is becoming the modulation method of choice in such systems.

As previously noted, external modulation is often accomplished with an interferometric $LiNbO_3$ modulator. The $LiNbO_3$ external modulator must be linearized so that the light output from the laser is linearly proportional to the current injected into the laser. This can be accomplished with predistortion circuitry. Thus, a carefully designed, nonlinear circuit is placed before the nonlinear modulator so that the combined transfer function of the predistorter/modulator is linear.

Conventional externally modulated transmitters, however, are fundamentally limited with respect to dynamic range. Predistortion is limited to a specific dynamic range, outside of which the relationship between power output and RF input, i.e., the transfer function of the transmitter, is highly nonlinear, such that the predistortion becomes inefficient and eventually impossible. Even with near-perfect predistortion, the dynamic range is limited. Consequently, the maximum optical modulation depth, or optical modulation index ("OMI") that an externally modulated predistorted transmitter can handle without generating unacceptable levels of distortion is severely limited.

This limitation on OMI per channel, in turn, limits the maximum achievable carrier-to-noise ratio (CNR) for each channel. Acceptable linearization can be obtained with predistortion in practical implementations where, although the amplitude of the RF signal can greatly exceed the dynamic-range limit, the probability of that event occurring is low. However, to keep this probability low, the number of channels and/or the OMI per channel must be severely curtailed. Effectively, when the number of channels on and/or the OMI increase, the probability that the total RF power will fall outside the linearized range increases steeply, leading to a sharp degradation in CTB and fifth-order distortion performance. Increasing the dynamic range of the transmitter would allow for higher OMI per channel without creating unacceptable levels of distortion, particularly CTB and fifth-order distortion.

Thus, there is a need for a method of external modulation that increases the dynamic range of a transmitter, thereby minimizing distortion and reducing the adverse impact of clipping.

SUMMARY OF THE INVENTION

The present invention provides methods and apparatus for external optical modulation that increases the dynamic range of a transmitter, thereby minimizing distortion and reducing clipping.

In a preferred embodiment, a linearized external modulator transmitter with improved dynamic range is provided with a limiter connected to a subtractor. The limiter and the subtractor each receive the same input. In addition, the subtractor receives an input from the limiter. A predistortion circuit is connected to a modulator and also receives an input from the limiter. The modulator receives an input from a laser, to which the subtractor is connected via a tunable gain circuit. Advantageously, the transmitter uses both direct and external modulation to improve distortion performance at high OMI per channel. Preferably, the transmitter switches from external modulation to direct modulation according to the amplitude of the signal to be transmitted.

According to a general aspect of the invention, a modulation method is provided which improves the dynamic range of the transmitter by limiting the amplitude of a time-varying signal to preset positive and negative ceiling levels. The transmitter is externally modulated with the limited signal, and directly modulated with any excess part of the time-varying signal that exceeds in amplitude the absolute value of either of the preset positive and negative levels.

In accordance with a further aspect of the invention, the time-varying input signal to the transmitter may be limited with a preset ceiling level on positive amplitude only. Advantageously, analog distortion performance is thereby enhanced. In accordance with a still further aspect of the invention, digital inputs and/or compressed-digital inputs can be added, without sacrificing the bit-error-rate ("BER") of these digital and/or compressed channels. Preferably, the transmitter is compatible with decompression techniques used in receivers associated with directly modulated lasers.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENT

Figure 1:
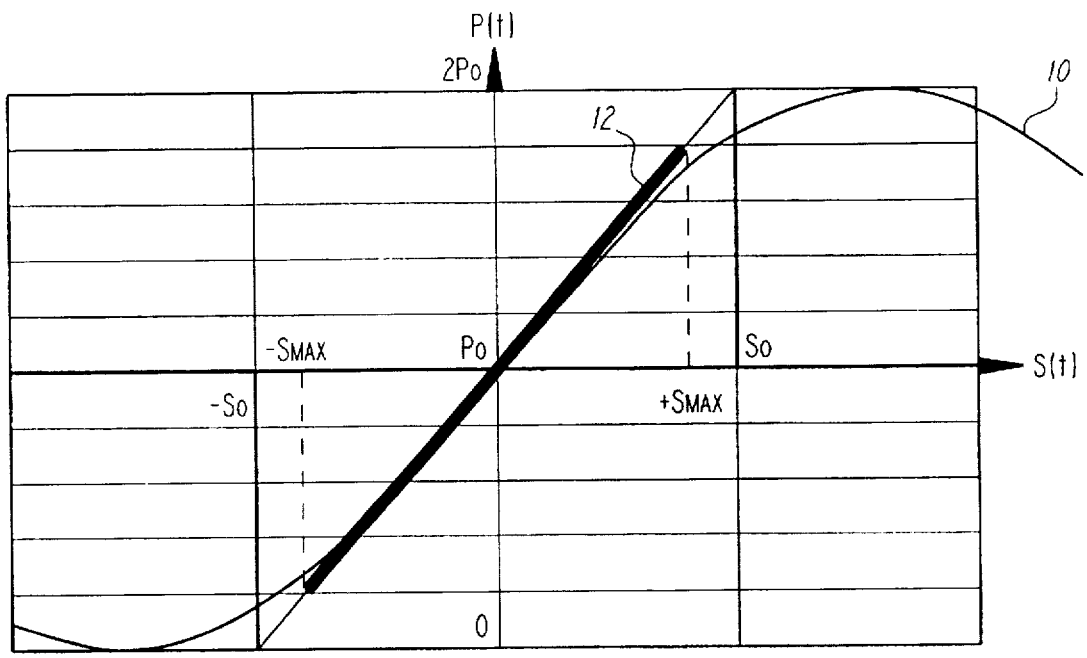
FIG. 1 is a graph showing optical power output as a function of RF input for an externally modulated transmitter.

Referring to FIG. 1, the optical power output of an externally modulated transmitter (not shown) is related to an RF input signal by the transfer function of the transmitter, or P(S). As can be observed, $P(t)=P_0[1+\sin(S(t)/S_0)]$, where P(t) is the optical output power of the transmitter, $P_0$ is the average output power, S(t) is the RF input to the transmitter, and $S_0$ is a parameter that characterizes the transmitter. The transfer function P(S), which represents the output optical power as a function of the input RF signal in the absence of predistortion linearization, is shown as a curve 10.

The relationship between S(t) and P(t) is nonlinear. Predistortion, a technique known in the art, is used to restore linearity, producing a line (or linearized curve) 12. However, predistortion is limited to the dynamic range bounded by $-S_{max}$ and $+S_{max}$, i.e., $\{-S_{max}, +S_{max}\}$. Outside of this range, the relationship between S(t) and P(t) is highly nonlinear, with predistortion becoming increasingly inefficient. In effect, outside of the range bounded by $-S_0$ and $+S_0$, or $\{-S_0, +S_0\}$, predistortion is not practical.

A small portion, i.e., a fraction, of the signal S(t) that is outside of the $\{-S_{max}, +S_{max}\}$ dynamic range is herein designated as ΔS. Similarly, the variation of output power created by ΔS is designated as ΔP. The relationship between ΔS and ΔP is, therefore, highly nonlinear. However, the probability of S(t) being outside of the $\{-S_{max}, +S_{max}\}$ range is relatively low in most practical implementations. Thus, although the amplitude of the RF signal S(t) can greatly exceed $S_{max}$ and even $S_0$, the probability of that event occurring is low. For this reason, acceptable linearization can be obtained with predistortion. However, the probability that the total signal S(t) will fall outside the linearized range created with predistortion rises sharply as the number of RF channels used increases, or as the OMI per channel is increased. This can result in unacceptable levels of higher order distortion.

Figure 2:
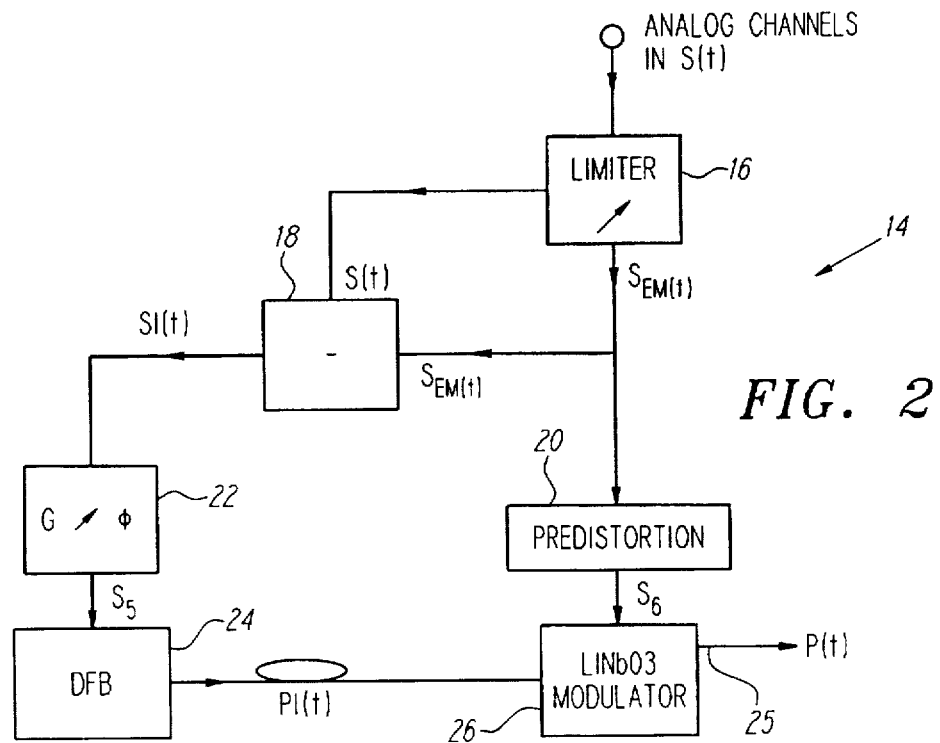
FIG. 2 is a schematic block diagram of a first preferred transmitter for transmitting modulated analog channels in accordance with one aspect of the present invention.

Referring to FIG. 2, a preferred transmitter 14, which provides increased dynamic range without unacceptable levels of distortion, transmits a plurality of analog channels carried in an RF signal S(t). Signal S(t) is input into a limiter 16, which outputs RF signal $S_{EM}(t)$ according to the following conditions of RF input signal S(t): $S_{EM}(t)$ equals S(t) when the absolute value of S(t) is less than $S_{max}$; $S_{EM}(t)$ equals $S_{max}$ when S(t) is greater than $S_{max}$; and $S_{EM}(t)$ equals $-S_{max}$ when S(t) is less than $-S_{max}$, respectively. S(t) and $S_{EM}(t)$ are then input into a subtractor 18, which subtracts the later from the former and outputs the result as RF signal S1(t); i.e., the subtractor 18 generates a signal S1(t)=S(t)−$S_{EM}(t)$. Thus, S1(t) equals zero when the absolute value of S(t) is less than $S_{max}$; S1(t) equals S(t)−$S_{max}$ when S(t) is greater than $S_{max}$; and S1(t) equals S(t)+$S_{max}$ when S(t) is less than $-S_{max}$, respectively.

Output RF signal $S_{EM}(t)$ from the limiter 16 is also input into a predistortion circuit (hereinafter "predistorter") 20.

Output RF signal S1(t) from the subtractor 18 is input into a tunable gain circuit 22. In turn, an output RF signal $S_5$ from the tunable gain circuit 22 is input into a distributed feedback ("DFB") laser 24, which emits an optical power signal Pl(t). More particularly, the tunable gain circuit 22 adjusts the gain at the RF input port of the DFB laser 24. Pl(t) is then input into a LiNbO₃ external modulator 26. The external modulator 26 also receives an RF signal $S_6$, which is output from the predistorter 20. A modulated optical power signal P(t), which is linearly related to the RF input signal S(t), is then transmitted from an output port 25 of the external modulator 26. Phase adjustment is preferably added to achieve pure gain with no phase delay between the $S_5$ and $S_6$ signals.

In alternative preferred embodiments, the limiter 16 can be designed to avoid negative clipping of the RF input signal, so that when S(t) is less than $-S_{max}$, $S_{EM}(t)$ remains equal to S(t). This design alternative will improve analog distortion performance, particularly second-order, or composite second-order ("CSO") distortion, when S(t) is less than $-S_{max}$. However, if digital input channels are used, as described in greater detail below, distortion performance can be diminished when S(t) is less than $-S_{max}$. The subtractor 18 can be modified to compensate for differential delays and attenuations. Thus, a preferred subtractor 18 may include a variable delay line (not shown), phase adjustment circuitry (not shown), and/or a tunable attenuator (not shown) as needed to perform the subtraction operation to the greatest possible degree of accuracy.

As noted above, when S(t) falls within the $\{-S_{max}, +S_{max}\}$ range, i.e., which is most of the time, the entire signal S(t) is sent to the predistorter 20, and then to external modulator 26. As noted above, P(t) is linear for S(t) in this predistorted range. When, in rare occasions, S(t) falls outside the $\{S_{max}, +S_{max}\}$ range, the component of the signal S(t) that is greater than $S_{max}$, S1(t), is sent to directly modulate the DFB laser 24. In accordance with a general aspect of the present invention, external modulation does not occur during the time that direct modulation is being performed.

The linearity of the analog DFB laser 24 preferably far exceeds the linearity of the external modulator 26 in regions where the absolute value of S(t) is greater than $S_{max}$. Therefore, the transmitter 14 experiences greatly improved distortion performance—particularly at high OMI per channel—provided that the probability of the absolute value of S(t) being greater than $S_{max}$ is low, but non-negligible. Thus, in accordance with this aspect of the invention, improved distortion performance can be achieved even when fiber-induced and EDFA-induced distortion are taken into account, and even if a non-predistorted DFB laser 24 is used.

Figure 3:
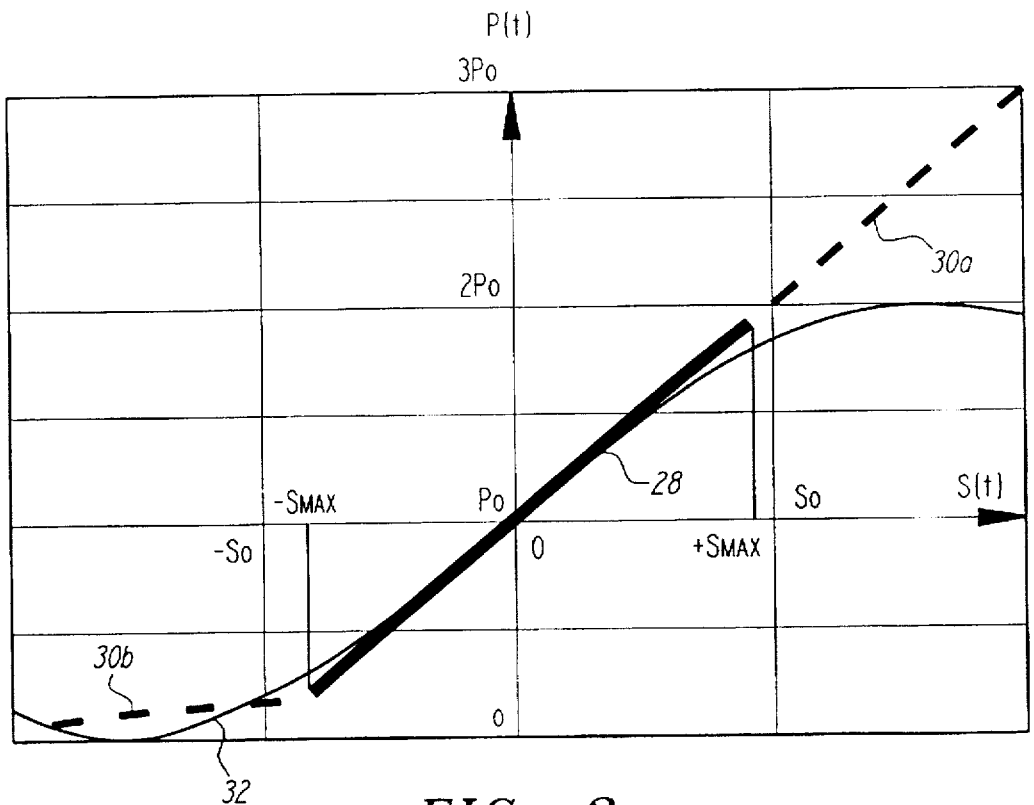
FIG. 3 is a graph showing optical power output as a function of RF input for the transmitter of FIG. 2.

Referring to FIG. 3, a graph of the optical power output P(t) from output port 25 of transmitter 14 is shown as a function of the RF input signal S(t). Once again, the transfer function can be called P(S) and includes an external-modulation component of the transfer function P(S) represented by a solid line 28, and first and second direct modulation components, represented by dotted lines 30a and 30b, respectively. Specifically, the dotted segment 30a represents direct modulation of the DFB laser 24 when S(t) is greater than $S_{max}$. The dotted segment 30b, on the other hand, represents direct modulation of the DFB laser 24 when S(t) is less than $-S_{max}$. The dotted segment 30b is replaced with the curved portion 32 in the alternative preferred embodiment described above, wherein the limiter 16 is designed to set $S_{EM}(t)$ equal to S(t) when S(t) is less than $-S_{max}$.

Assuming perfect linearization of the external modulator 26 in the $\{-S_{max}; =S_{max}\}$ interval, P(t) may be expressed as P(t)=P(S) =Pl(t)*L|1+$S_{EM}$(t)/$S_o$|, where P(S) is the transfer function of the transmitter 14, L is the loss across the external modulator 26 at the bias point, $S_6$ is the RF input to the modulator and Pl(t) is the power input to the external modulator 26. Pl(t) is generally expressed as Pl(t)=$Pl_o$*|1+ $S_5$|, where $Pl_o$ is the laser's average output power and $S_5$ is the RF signal on the laser. $P_o$, the average output power from the modulator 26, is related to $Pl_o$, where $P_o$=L*$Pl_o$. Thus, using the relationships set forth above, the transfer function P(S) may be expressed as P(S)=$Pl_o$*L|1+$S_5$|*|1+$S_{EM}$/$S_o$|.

According to one aspect of the invention, when S(t) falls between the points $S_{max}$ and $-S_{max}$, $S_5$ is equal to zero and $S_{EM}$(t) is equal to S(t). In this region, P(S)=$P_o$*|1+S(t)/$S_o$|. When S(t) is greater than Smax, the modulation is directed toward the DFB laser 24, such that the portion of S(t) that exceeds $S_{max}$ is sent through the tunable gain circuit 22 to the laser 34, as described above. In this region, $S_5$=G(S(t) $-S_{max}$) and $S_{EM}$=$S_{max}$, where G is the tunable gain 22 and, thus, P(S)=$P_o$|1+G(S(t)-$S_{max}$)|*|1+$S_{max}$/$S_o$|.

For the respective slopes of the dotted line 30a and the solid line 28 to be equal on either side of the point S(t)=$S_{max}$, the tunable gain G in circuit 22 must be set to the value G=1/($S_o$+$S_{max}$) Substitution of this value into the above-expression for P(S) yields, P(S)=$P_o$[1+S(t)/$S_o$], which is identical to the expression for P(S) in the $\{-S_{max}; +S_{max}\}$ region. As described above, setting the gain G to its correct value in transmitter 14 can be achieved by minimizing third order distortion in a two or multitone set-up. If tuning is not achieved, the slopes of the dotted line 30a and the solid line 28 will be different, leading to odd order distortion and, in particular, third order distortion.

In accordance with another aspect of the invention, when S(t) is smaller than $-S_{max}$, the modulation is directed toward the DFB laser 24 such that the portion of S(t) which is smaller than $-S_{max}$ is sent through the tunable gain circuit 22 to the laser 24, as described above. In this region, $S_5$=G(S (t)-$S_{max}$) and $S_{EM}$=$-S_{max}$, where G is equal to the tunable gain 22, which has been set to its correct value, G=1/($S_o$+ $S_{max}$). From the afore-described relationships, P(S)=$P_o$[1+ (S(t)-$S_{max}$)/(So +$S_{max}$)]*[1-$S_{max}$/$S_o$]. After simplification, P(S)=$P_o$[1+S(t)/$S_o$]($S_o$-$S_{max}$), which applies when S(t) is less than $-S_{max}$.

For ideal linearity, the slopes of the dotted line 30b and the solid line 28 would be set equal on either side of the point where S(t)=$-S_{max}$. As can be seen in FIG. 3, however, the dotted line 30b would rapidly approach the point of zero optical power output for the transmitter 14, if the slope of the dotted line 30b were equal to the slope of the solid line 28. Thus, a compression factor is applied to the transfer function P(S) whenever S(t) is less than $-S_{max}$. The compression factor, which is represented by ($S_o$+$S_{max}$)/($S_o$-$S_{max}$), is multiplied by the transfer function P(S), yielding the following equation: P(t)=$P_o$[($S_o$+$S_{max}$)/($S_o$-$S_{max}$)]|1+S(t)/S0|. Thus, when S(t) falls within the range $\{-S_{max}$,+$S_{max}\}$, the slope of the solid line 28 is 1/$S_0$. When S(t) is less than $-S_{max}$, the slope of the dotted line 30b is |($S_o$-$S_{max}$)/($S_o$+ $S_{max}$)| (1/$S_o$). Consequently, the slope of the dotted line 30b is flatter than the slope of the solid line 28.

As discussed above, to enhance analog distortion performance of the transmitter 14 is possible in alternate preferred embodiments to configure the limiter 16 to act only on the positive side, i.e., only when S(t) is greater than $S_{max}$. In this case, if S(t) is less than $S_{max}$, Sl(t) from the subtractor 18 is zero—even if S(t) is less than $-S_{max}$. Thus, the curve 32 would represent the transfer function P(S) when S(t) is less than $-S_{max}$. However, in an alternate preferred embodiments where the dotted line 30b represents the transfer function P(S) when S(t) is less than $-S_{max}$, digital input channels, if transmitted in conjunction with the analog input channels, will have improved BER. This improvement is due to the fact that on curve 30b, the amplitude of S(t) on the negative side, (i.e., for which the optical output power is zero), is much larger than it was on curve 32. This leaves some "room" for the digital carriers.

Moreover, efficient signal compression is provided in the low-output-power region where clipping induced distortion on the analog carriers can be avoided only by using compression and/or decompression techniques as known in the art. See, e.g., "Equalization Technique to Reduce Clipping-Induced Nonlinear Distortion in Subcarrier-Multiplexed Lightwave Systems," by Keang-Po et al., IEEE Photon. Tech. Lett., V5, N9, September 1993, at pp. 1100–1103, which is fully incorporated by reference herein. Such a hybrid analog/digital-multiplexed optical transmission system with improved BER of the digital carriers is now described in conjunction with the preferred embodiment of FIG. 4.

Figure 4:
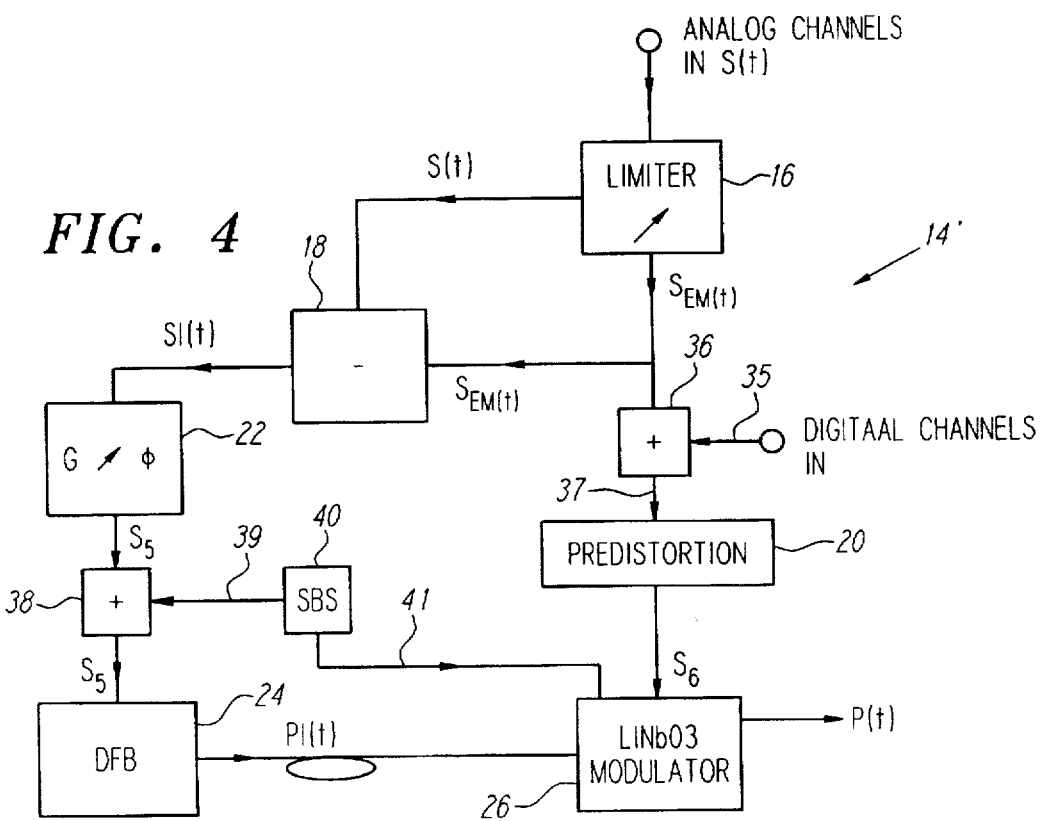
FIG. 4 is a schematic block diagram of a second preferred transmitter for transmitting analog and digital channels in accordance with a further aspect of the present invention.

Referring to FIG. 4, in a modified preferred transmitter 14', digital input channels are added into the modulated output in combination with analog input channels carried in signal S(t)—e.g., for use in transmitting compressed-digital-video (CDV) signals. More particularly. A digital data stream 35 carrying one or more digital input channels is combined with $S_{EM}$(t) with a first adder 36. The output 37 from the adder 36 is then sent through the predistorter 20 to the LiNbO3 external modulator 26. The modified transmitter 14' also includes a Stimulated-Brillouin-Scattering ("SBS") suppression block 40. SBS, a consequence of fiber nonlinearity, refers to light that is scattered from acoustic phonons in the fiber. As SBS can cause rapid decreases in CNR, the phenomenon must necessarily be suppressed in externally modulated systems. In particular, the SBS suppression block 40 transmits a first SBS suppression signal 39 into a second adder, where it is combined with signal $S_5$ from the tunable gain circuit 22, and a second SBS suppression signal 41 into the modulator 26. In this manner, a mixture of analog, compressed-digital, and digital signals can be transmitted with enhanced distortion performance, increased ONI/channel in particular for the analog channels and improved BER on the digital channels.

While preferred embodiments have been shown and described, it will be apparent to one of ordinary skill in the art that numerous alterations may be made without departing from the spirit or scope of the invention.

For example, it will be understood to one skilled in the art that, in addition to classic external modulators such as those based on LinbO3 single Mach-Zender modulators, the invention described herein is also applicable more complex modulators, as well as to modulators based on other electro-optic materials like InGaAs. In particular, the invention may be advantageously applied to dual serial and dual parallel modulators.

Moreover, for dual-serial Mach-Zender modulators, a predistortion circuit such as circuit 20 of FIGS. 2 and 4 is not needed when "perfect" third order optical linearization is achieved. See, e.g., "Linearization of Electro-optic Modulators by a Cascade Coupling of Phase Modulating Electrodes", Halvor Skeie et al., SPIE, V1583, Integr. Opt. Circuits, 1991, pp. 153–164, and U.S. Pat. No. 5,148,503, entitled "Apparatus and Method for Linearized Cascade Coupled Integrated Optical Modulator," which are both fully incorporated by reference herein. With these devices, the present invention will in particular reduce fifth order distortion due to clipping. Because fifth order predistortion would be difficult with such modulators, this invention applies advantageously.

Thus, the invention is not to be limited except in accordance with the following claims.

What is claimed:

1. A method of modulating a laser, comprising the steps of:

limiting the amplitude of a time-varying input signal to preset positive and negative ceiling levels;

externally modulating the laser with a limited signal portion derived from the limiting step; and directly modulating the laser with any excess part of the time-varying input signal that exceeds in amplitude the absolute value of the respective preset positive and negative ceiling levels of the limiting step.

2. The method of claim 1, wherein the externally modulating step comprises the steps of linearizing an external modulator and inputting the limited signal portion into the linearized external modulator.

3. The method of claim 1, wherein the directly modulating step comprises the steps of subtracting the limited signal portion from the time-varying input signal to produce an excess signal, tuning the gain of the excess signal, and feeding the excess signal directly to the laser.

4. The method of claim 1, comprising the further step of transmitting a light signal from the directly modulated laser to the external modulator.

5. The method of claim 1, wherein the externally modulating step and the directly modulating step are performed at different points in time according to the amplitude of the time-varying input signal.

6. A method of modulating a laser in a lightwave transmitter, comprising the steps of:

limiting the amplitude of a time-varying input signal to preset positive and negative ceiling levels corresponding to the outer positive and negative limits of the dynamic range of the transmitter;

sending a limited signal portion derived from the limiting step to a linearized external modulator;

subtracting the limited signal portion from the time-varying input signal to produce an excess signal; and feeding the excess signal directly to the laser.

7. The method of claim 6, comprising the further step of tuning the gain of the excess signal before performing the feeding step.

8. The method of claim 6, wherein the preset positive and negative ceiling levels of the limiting step are equal in absolute value.

9. A method of modulating a laser in a lightwave transmitter, comprising the steps of:

limiting the amplitude of a time-varying input signal with a preset positive ceiling level corresponding to the outer positive limit of the dynamic range of the transmitter;

transmitting a limited signal portion resulting from the limiting step to a linearized external modulator;

subtracting the limited signal portion from the time-varying input signal to produce an excess signal; and feeding the excess signal directly to the laser.

10. A lightwave transmitter, comprising:

a limiter configured to receive a time-varying input signal and to output a limited signal portion thereof, the limited signal portion having an amplitude range bound by preset positive and negative ceiling levels;

a subtractor configured to receive the input signal and the limited signal portion, and to output an excess signal comprising any portion of the input signal that exceeds in amplitude the absolute value of the respective preset positive and negative ceiling levels;

a tunable gain circuit configured to receive and amplify the excess signal;

a laser configured to receive the amplified excess signal and output a light signal;

a predistortion circuit configured to receive the limited signal portion, and to output a linearized signal; and an external modulator configured to receive the linearized signal and the light signal, and to output an optical power signal.

11. The transmitter of claim 10, wherein the preset positive and negative ceiling levels represent respective outer positive and negative limits of the dynamic range of the transmitter.

12. The transmitter of claim 10, wherein the transmitter switches between direct and external modulation of the laser according to the amplitude of the optical power output signal.

13. The transmitter of claim 10, wherein the optical power output signal is linearly related to the limited signal portion during external modulation of the laser, and the optical power output signal is linearly related to the excess signal during direct modulation of the laser.

14. The transmitter of claim 10, wherein the external modulator comprises an $LiNbO_3$ external modulator.

15. The transmitter of claim 10, wherein the laser comprises a distributed feedback laser.

16. The transmitter of claim 10, wherein the time-varying input signal comprises at least one analog input channel.

17. The transmitter of claim 10, further comprising an adder connected between the limiter and the predistortion circuit, the adder configured to receive a digital input signal.

18. The transmitter of claim 17, wherein the digital input signal comprises at least one compressed-digital input channel.

19. The transmitter of claim 17, further comprising an SBS suppression circuit configured to send a first signal to the adder and to send a second signal to the external modulator.

20. A lightwave transmitter, comprising:

a limiter configured to receive a time-varying input signal and to output a limited signal portion thereof, the limited signal portion having an amplitude range bound by a preset positive ceiling level;

a subtractor configured to receive the input signal and the limited signal portion, and to output an excess signal comprising any portion of the input signal that exceeds in amplitude the absolute value of the preset positive ceiling level;

a tunable gain circuit configured to receive and amplify the excess signal;

a laser configured to receive the amplified excess signal and output a light signal;

a predistortion circuit configured to receive the limited signal portion, and to output a linearized signal; and an external modulator configured to receive the linearized signal and the light signal, and to output an optical power signal.

21. The transmitter of claim 20, wherein the transmitter switches between direct and external modulation of the laser according to the amplitude of the optical power output signal.

* * * * *